United States Patent
Wang

(10) Patent No.: US 10,019,645 B2
(45) Date of Patent: Jul. 10, 2018

(54) IMAGE PROCESSING APPARATUS AND METHOD, AND ELECTRONIC EQUIPMENT

(71) Applicant: FUJITSU LIMITED, Kawasaki (JP)

(72) Inventor: Bingrong Wang, Beijing (CN)

(73) Assignee: FUJITSU LIMITED, Kawasaki-Shi (JP)

( * ) Notice: Subject to any disclaimer, the term of this patent is extended or adjusted under 35 U.S.C. 154(b) by 0 days.

(21) Appl. No.: 15/203,931

(22) Filed: Jul. 7, 2016

(65) Prior Publication Data

US 2016/0314371 A1   Oct. 27, 2016

Related U.S. Application Data

(63) Continuation of application No. PCT/CN2014/070462, filed on Jan. 10, 2014.

(51) Int. Cl.
*G06K 9/46* (2006.01)
*G06T 5/00* (2006.01)
(Continued)

(52) U.S. Cl.
CPC ......... *G06K 9/4661* (2013.01); *G06K 9/4604* (2013.01); *G06K 9/52* (2013.01);
(Continued)

(58) Field of Classification Search
CPC ...... G06K 9/4661; G06K 9/4604; G06K 9/52; G06T 7/0085; H04N 19/426; H04N 19/136
See application file for complete search history.

(56) References Cited

U.S. PATENT DOCUMENTS

2010/0302405 A1* 12/2010 Katagiri .............. H04N 5/243
                                                              348/222.1
2012/0301050 A1    11/2012 Wakazono
(Continued)

FOREIGN PATENT DOCUMENTS

CN   101102398 A   1/2008
CN   101102399 A   1/2008
(Continued)

OTHER PUBLICATIONS

Lee et al: "An Efficient Content-Based Image Enhancement in the Compressed Domain Using Retinex Theory", IEEE, 2007.*
(Continued)

*Primary Examiner* — Ruiping Li
(74) *Attorney, Agent, or Firm* — Staas & Halsey LLP

(57) ABSTRACT

Embodiments of the present disclosure provide an image processing apparatus and method, and electronic equipment. The apparatus includes: a decomposing unit configured to decompose luminance of an input image into an illumination component and a reflectance component; a compressing unit configured to compress the illumination component; an extending unit configured to extend the reflectance component; a combining unit configured to combine the compressed illumination component and the extended reflectance component, to obtain combined luminance; and an adjusting unit configured to adjust the combined luminance. By compressing the illumination component of an input image and extending the reflectance component, a contrast of the image may be efficiently enhanced and an image of a high dynamic range may be obtained, whereby a display effect of the image may be improved.

14 Claims, 7 Drawing Sheets

(51) Int. Cl.
*G06T 5/40* (2006.01)
*H04N 19/136* (2014.01)
*H04N 19/426* (2014.01)
*G06K 9/52* (2006.01)

(52) U.S. Cl.
CPC ............... *G06T 5/009* (2013.01); *G06T 5/40* (2013.01); *H04N 19/136* (2014.11); *H04N 19/426* (2014.11); *G06T 2207/20112* (2013.01); *G06T 2207/20192* (2013.01)

(56) References Cited

U.S. PATENT DOCUMENTS

2015/0123985 A1* 5/2015 Abe .................. G06T 5/008
                                                    345/590
2016/0372080 A1   12/2016 Abe et al.

FOREIGN PATENT DOCUMENTS

| CN | 102938144 A | 2/2013 |
|----|-------------|--------|
| JP | 2012-247873 | 12/2012 |
| JP | 2013-210709 | 10/2013 |
| WO | 2013/145365 | 10/2013 |

OTHER PUBLICATIONS

International Search Report dated Oct. 10, 2014, in corresponding International Application No. PCT/CN2014/070462.
Written Opinion of the International Searching Authority dated Oct. 10, 2014, in corresponding International Application No. PCT/CN2014/070462.
Zeev Farbman et al.: "Edge-preserving Decompositions for Multi-Scale Tone and Detail Manipulation," ACM Transactions on Graphics, vol. 27, No. 3, Article 67, Aug. 11, 2008.
Akiyama Fruit "Handbook of Image Analysis," University of Tokyo Press, 1$^{st}$ Edition, pp. 475-476, Nov. 10, 1995.
Japanese Office Action dated Oct. 3, 2017 in corresponding Japanese Patent Application No. 2016-545845.
Chinese Office Action dated Feb. 12, 2018 in corresponding Chinese Patent Application No. 201480072429.X, 5 pages.
Chinese Search Report dated Feb. 12, 2018 in corresponding Chinese Patent Application No. 201480072429.X, 2 pages.

* cited by examiner

IMAGE PROCESSING APPARATUS AND METHOD, AND ELECTRONIC EQUIPMENT

CROSS-REFERENCE TO RELATED APPLICATIONS

This application is a continuation application, filed under 35 U.S.C. § 111(a), of International Application PCT/CN2014/070462 filed on Jan. 10, 2014, the entire contents of which are hereby incorporated by reference.

BACKGROUND

1. Field

The present disclosure relates to the field of information, and in particular to an image processing apparatus and method, and electronic equipment.

2. Description of the Related Art

The current camera apparatus use a uniform exposure setting at one shooting for the whole scene. So there are many situations that can result in images exhibiting poor contrast. An example is hazy images where objects lose contrast because their radiance is scattered in the haze. Another example is backlit images where some portions of the scene are in shadow and other portions contain very bright information, thereby resulting in a poor contrast. Currently, main methods for image contrast enhancement are: a method of global tone reproduction, a method of global histogram equalization, a homomorphic filtering method, and a multi-scale Retinex algorithm.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Following defects exist in the methods above in the relevant art: in the method of global tone reproduction, contrasts of part of image regions will be lost, thereby making the image look faded; in the method of global histogram equalization, the output image is unnatural; in the homomorphic filtering method, the display of the edges of the image is unclear, and a halo phenomenon will be produced; and in the multi-scale Retinex algorithm, a halo phenomenon can still not be eliminated.

Embodiments of the present disclosure provide an image processing apparatus and method, and electronic equipment, in which by compressing the illumination component of an input image and extending the reflectance component, a contrast of the image may be efficiently enhanced and an image of a high dynamic range may be obtained, whereby a display effect of the image may be improved.

According to a first aspect of embodiments of the present disclosure, there is provided an image processing apparatus, including: a decomposing unit configured to decompose luminance of an input image into an illumination component and a reflectance component; a compressing unit configured to compress the illumination component; an extending unit configured to extend the reflectance component; a combining unit configured to combine the compressed illumination component and the extended reflectance component, to obtain combined luminance; and an adjusting unit configured to adjust the combined luminance.

According to a second aspect of the embodiments of the present disclosure, there is provided electronic equipment, including the image processing apparatus as described in the first aspect.

According to a third aspect of the embodiments of the present disclosure, there is provided an image processing method, including: decomposing luminance of an input image into an illumination component and a reflectance component; compressing the illumination component; extending the reflectance component; combining the compressed illumination component and the extended reflectance component, to obtain combined luminance; and adjusting the combined luminance.

An advantage of the embodiments of the present disclosure exists in that by compressing the illumination component of an input image and extending the reflectance component, a contrast of the image may be efficiently enhanced and an image of a high dynamic range may be obtained, whereby a display effect of the image may be improved.

With reference to the following description and drawings, the particular embodiments of the present disclosure are disclosed in detail, and the principle of the present disclosure and the manners of use are indicated. It should be understood that the scope of embodiments of the present disclosure is not limited thereto. Embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings using ordinary skill. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of the present disclosure shall be described below with reference to the accompanying drawings. These embodiments are illustrative only, and are not intended to limit the present disclosure.

Embodiment 1

Figure 1:
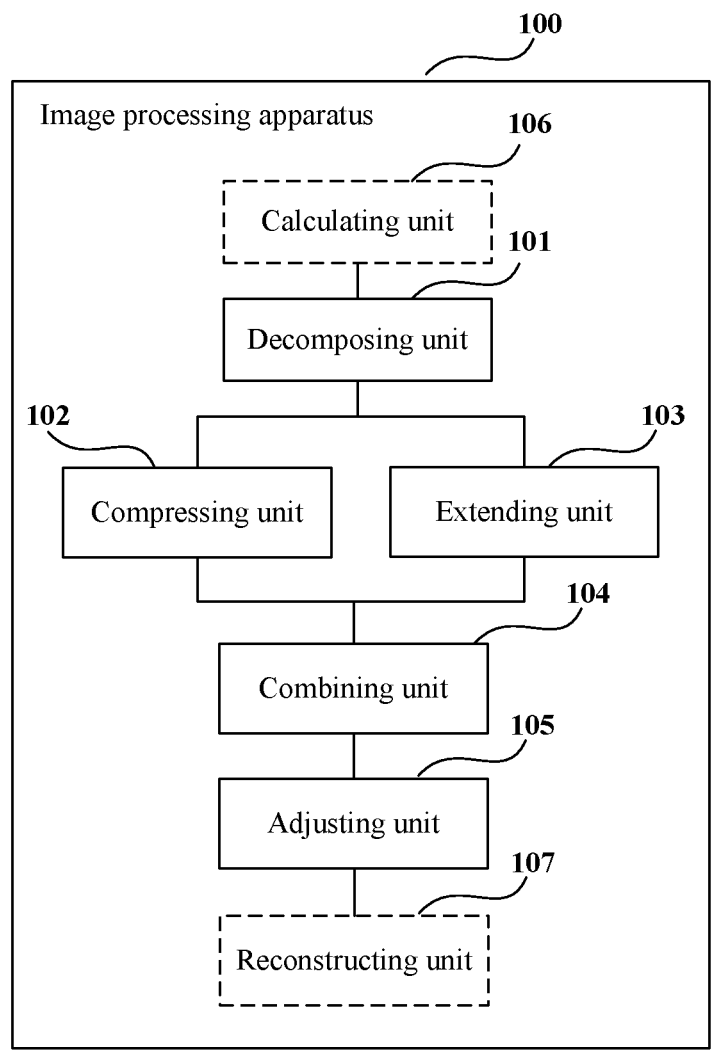
FIG. 1 is a schematic diagram of a structure of the image processing apparatus of Embodiment 1 of the present disclosure.

FIG. 1 is a schematic diagram of a structure of the image processing apparatus of Embodiment 1 of the present disclosure. As shown in FIG. 1, the apparatus 100 includes: a decomposing unit 101, a compressing unit 102, an extending unit 103, a combining unit 104 and an adjusting unit 105.

The decomposing unit 101 is configured to decompose luminance of an input image into an illumination component and a reflectance component; the compressing unit 102 is configured to compress the illumination component; the extending unit 103 is configured to extend the reflectance component; the combining unit 104 is configured to combine the compressed illumination component and the extended reflectance component, to obtain combined luminance; and the adjusting unit 105 is configured to adjust the combined luminance.

It can be seen from the above embodiment that by compressing the illumination component of an input image and extending the reflectance component, a contrast of the image may be efficiently enhanced and an image of a high dynamic range may be obtained, whereby a display effect of the image may be improved.

In this embodiment, the input image may be obtained by using any existing method. For example, acquiring an image or reading a frame of image form a video. For example, when a data form of the input image is of an integer type of 8 bits, it may be converted into a single precision form of a range of [0,1]. However, an acquisition method and a data form of the input image are not limited in this embodiment.

In this embodiment, the luminance of the input image may be obtained by using any existing method.

For example, when the input image is a gray scale image, the luminance Y of the input image may be obtained directly.

When the input image is a color image, the apparatus 100 may further include a calculating unit 106 configured to calculate the luminance of the input image. In this embodiment, the calculating unit 106 is optional, and is shown in a dotted box in FIG. 1.

In this embodiment, the calculating unit 106 may calculate the luminance of the input image by using any existing method. For example, the luminance Y(x) of the input image may be obtained through calculation by using Formula (1) below:

$$Y(x) = [\,65.481/255 \quad 128.553/255 \quad 24.966/255\,] * \begin{bmatrix} I^R(x) \\ I^G(x) \\ I^B(x) \end{bmatrix} + 16/255; \quad (1)$$

where, x denotes a position of a pixel in the input image, $I^c$ (c=R, G, B) denotes R, G, B components of the input image, and Y(x) denotes the luminance of the input image at the position x, $16/255 \le Y(x) \le 235/255$.

However, this embodiment of the present disclosure is not limited to the above calculation method.

In this embodiment, the decomposing unit 101 may decompose the luminance of the input image into the illumination component and the reflectance component by using any existing method. A structure of the decomposing unit of this embodiment and a decomposing method used by it shall be illustrated below.

Figure 2:
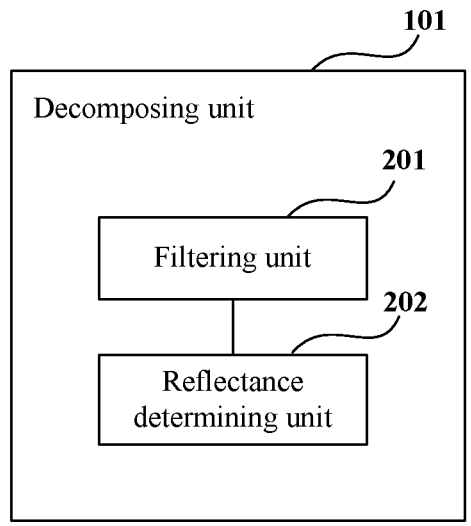
FIG. 2 is a schematic diagram of a structure of the decomposing unit of Embodiment 1 of the present disclosure.

FIG. 2 is a schematic diagram of a structure of the decomposing unit 101 of Embodiment 1 of the present disclosure. As shown in FIG. 2, the decomposing unit 101 includes: a filtering unit 201 and a reflectance determining unit 202.

The filtering unit 201 is configured to perform edge-preserving filtering on the luminance of the input image, so as to obtain the illumination component; and the reflectance determining unit 202 is configured to determine the reflectance component according to the luminance of the input image and the illumination component.

Figure 3:
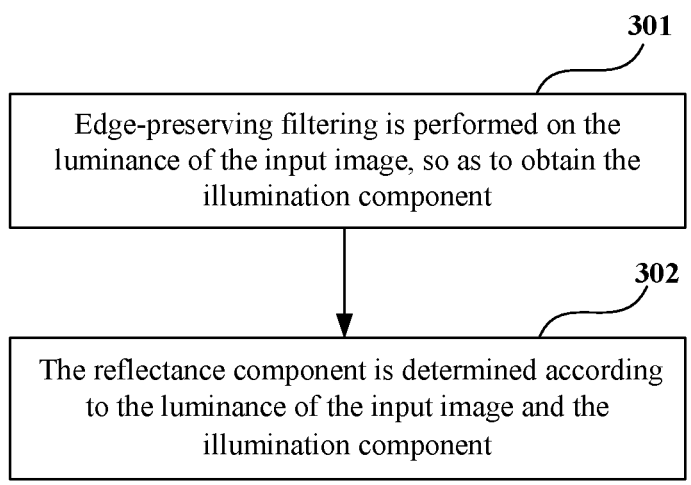
FIG. 3 is a flowchart of a method for decomposing luminance of an input image by the decomposing unit of Embodiment 1 of the present disclosure.

FIG. 3 is a flowchart of a method for decomposing the luminance of the input image by the decomposing unit of Embodiment 1 of the present disclosure. As shown in FIG. 3, the method includes:

Step 301: edge-preserving filtering is performed on the luminance of the input image, so as to obtain the illumination component; and Step 302: the reflectance component is determined according to the luminance of the input image and the illumination component.

By obtaining the illumination component of the input image by the edge-preserving filtering, a display effect of the edge parts of the image may be improved, and generation of a halo phenomenon may be avoided.

In this embodiment, on a basis of the existing Retinex theory, the luminance of the input image may be expressed as a product of the reflectance component R and the illumination component L, which may be expressed Formula (2) below:

$$Y(x) = R(x) \cdot L(x) \quad (2);$$

where, x denotes a position of a pixel in the input image, Y(x) denotes the luminance of the input image, R(x) denotes the reflectance component of the input image, and L(x) denotes the illumination component of the input image.

In this embodiment, any existing method may be used to perform edge-preserving filtering on the luminance of the input image. The method of edge-preserving filtering adopted in this embodiment of the present disclosure shall be illustrated below.

For example, weighted least squares (WLS) may be used to perform the edge-preserving filtering, which may be expressed Formula (3) below:

$$L = F_{WLS}(Y, \alpha, \lambda) \quad (3);$$

where, L denotes the illumination component of the input image, $F_{WLS}$ denotes a WLS filtering function, $\alpha$ denotes an affinity degree control coefficient, and $\Delta$ denotes a filtering coefficient. For example, increase of $\alpha$ will make an edge of the image more sharp, and increase of $\lambda$ will make the image more smooth.

In this embodiment, values of $\alpha$ and $\lambda$ may be set according to an actual application demand. For example, following values may be taken: $\alpha=1.6$, $\lambda=1.5$; however, this embodiment is not limited thereto.

By performing the edge-preserving filtering by using the weighted least squares (WLS), the obtained illumination component may be made more reliable.

In this embodiment, after the filtering unit 201 obtains the illumination component, the reflectance determining unit 202 determines the reflectance component R(x) of the input image according to the luminance Y(x) of the input image and the illumination component L(x).

In this embodiment, after the illumination component and the reflectance component of the input image are obtained, the compressing unit 102 compresses the illumination component, and the extending unit 103 extends the reflectance component. In this embodiment, any existing methods may be used to compress the illumination component and extend the reflectance component. Methods for compressing the illumination component and extending the reflectance component of this embodiment shall be illustrated below.

In this embodiment, compressing the illumination component refers to, for example, performing gain on luminance of under-exposed pixels in the illumination component, and performing suppression on luminance of over-exposed pixels in the illumination component.

Figure 4:
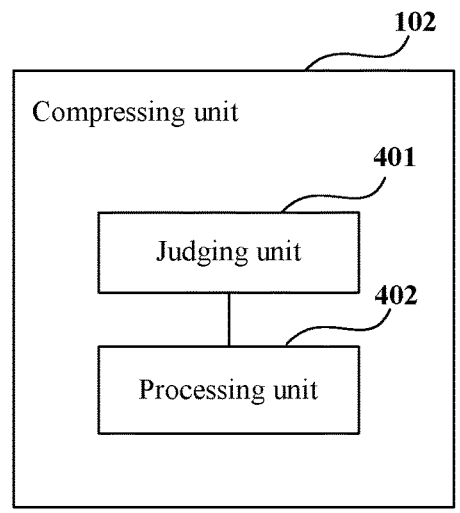
FIG. 4 is a schematic diagram of a structure of the compressing unit of Embodiment 1 of the present disclosure.

FIG. 4 is a schematic diagram of a structure of the compressing unit of this embodiment. As shown in FIG. 4, the compressing unit 102 compresses each pixel of the illumination component. In compressing each pixel, the compressing unit 102 includes: a judging unit 401 and a processing unit 402.

The judging unit 401 is configured to judge whether luminance of the pixel is greater than an average value of luminance of the illumination component; and the processing unit 402 is configured to perform gain on the luminance of the pixel when the luminance of the pixel is less than or equal to the average value of luminance of the illumination component, and perform suppression on the luminance of the pixel when the luminance of the pixel is greater than the average value of luminance of the illumination component.

Figure 5:
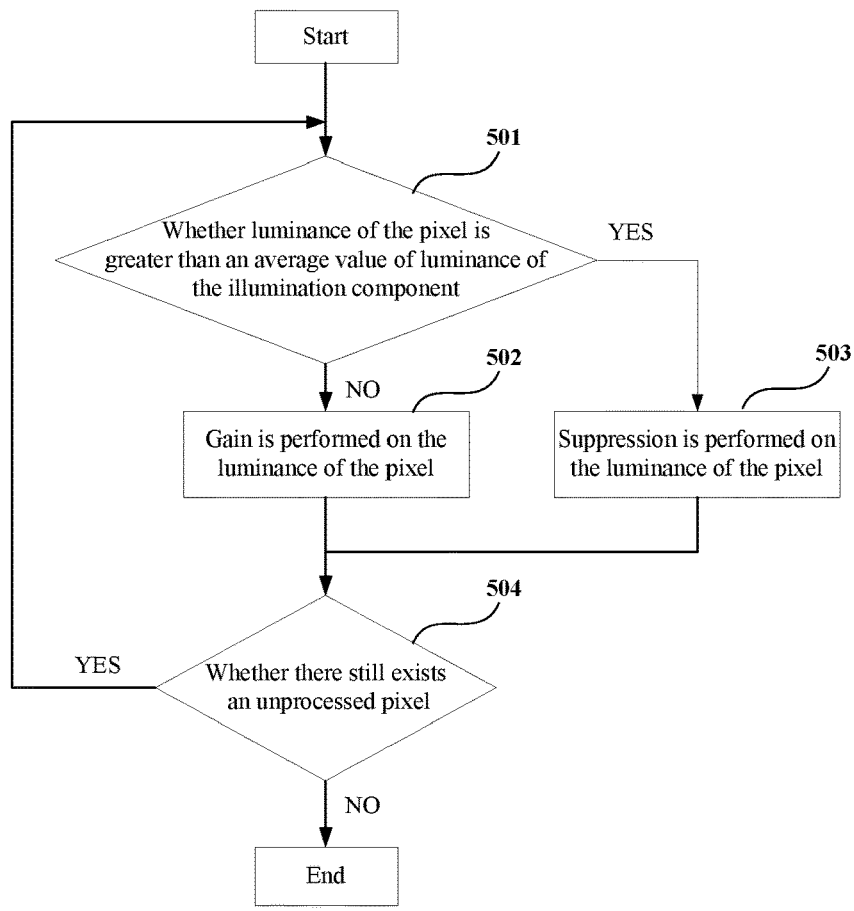
FIG. 5 is a flowchart of a method for compressing an illumination component of Embodiment 1 of the present disclosure.

FIG. 5 is a flowchart of a method for compressing the illumination component of this embodiment. As shown in FIG. 5, the method includes:

Step 501: it is judged whether luminance of pixel is greater than an average value of luminance of the illumination component, entering into step 502 when it is judged "NO", and entering into step 503 when it is judged "YES";

Step 502: gain is performed on the luminance of the pixel;

Step 503: suppression is performed on the luminance of the pixel; and

Step 504: it is judged whether there still exists an unprocessed pixel, turning back to step 501 when it is judged "YES", and terminating the processing when it is judged "NO".

Figure 6:
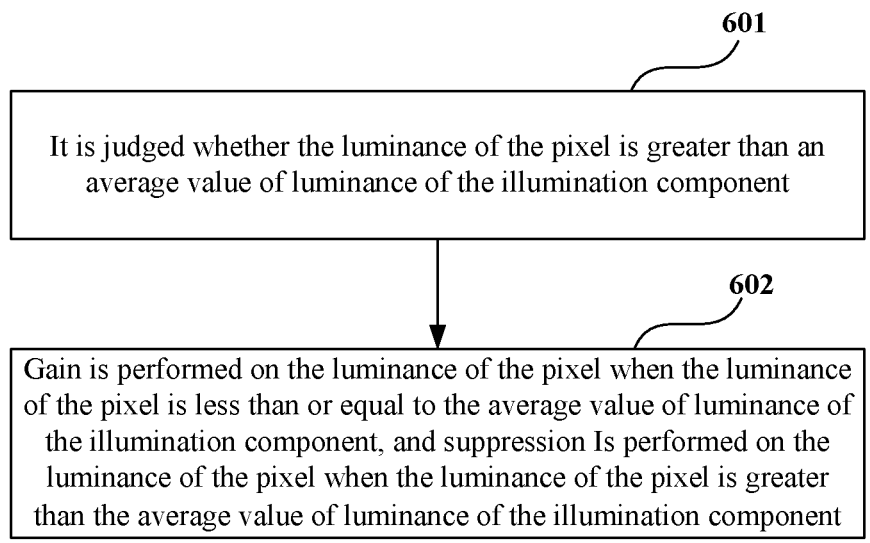
FIG. 6 is a flowchart of a method for compressing a pixel in the illumination component of Embodiment 1 of the present disclosure.

FIG. 6 is a flowchart of a method for compressing a pixel in the illumination component of this embodiment. As shown in FIG. 6, the method includes:

Step 601: it is judged whether the luminance of the pixel is greater than an average value of luminance of the illumination component; and Step 602: gain is performed on the luminance of the pixel when the luminance of the pixel is less than or equal to the average value of luminance of the illumination component, and suppression is performed on the luminance of the pixel when the luminance of the pixel is greater than the average value of luminance of the illumination component.

By performing gain on the luminance of the under-exposed pixels and performing suppression on the luminance of the over-exposed pixels, exposure of the image may be made uniform, whereby the display effect of the image may be improved further.

Figure 7:
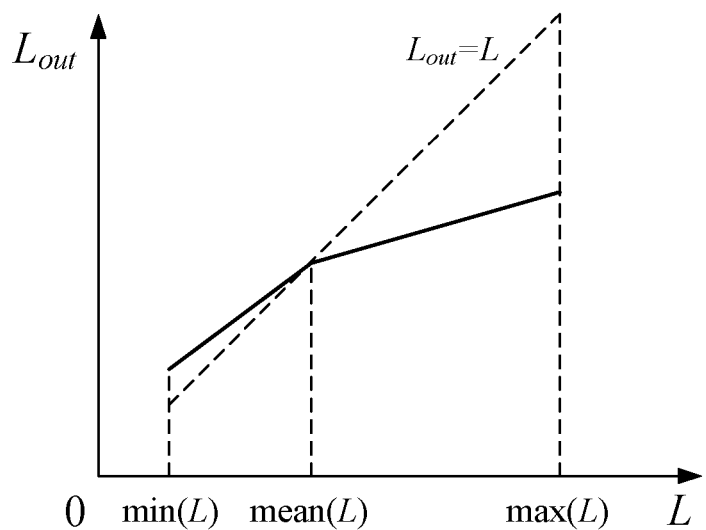
FIG. 7 is a schematic diagram of a curve of a gain and suppression function of Embodiment 1 of the present disclosure.

In this embodiment, any existing method may be used to perform gain or suppression on the pixel. For example, FIG. 7 is a schematic diagram of a curve of a gain and suppression function of this embodiment. As shown in FIG. 7, the function may be expressed by Formula (4) below:

$$L_{out}(x) = (1 - a(L(x))) * L(x) + a(L(x)) * \text{mean}(L(x)) \quad (4);$$

where, $a(L(x))$ denotes a gain or suppression coefficient, values of which being different when $L(x) \leq \text{mean}(L(x))$ or $L(x) > \text{mean}(L(x))$, that is, values of $a(L(x))$ are different in performing the gain or the suppression, $0 \leq a(L(x)) \leq 1$, $L_{out}(x)$ denotes an illumination component after the gain and suppression, $L(x)$ denotes an illumination component before the gain and suppression, and $\text{mean}(L(x))$ denotes the average value of luminance of the illumination component.

In this embodiment, the values of $a(L(x))$ may be set according to an actual application demand, and the greater a value of $a(L(x))$, the higher a degree of gain and suppression. For example, the values of $a(L(x))$ are different in a region of $L(x) \leq \text{mean}(L(x))$ and a region of $L(x) > \text{mean}(L(x))$ shown in FIG. 6, that is, the values of $a(L(x))$ are different in performing the gain or the suppression. For example, in the region of $L(x) \leq \text{mean}(L(x))$, $a(L(x))$ is set to be 0.2, and in the region of $L(x) > \text{mean}(L(x))$, $a(L(x))$ is set to be 0.9. However, this embodiment of the present disclosure is not limited to the above values.

In this embodiment, any existing method may be used to extend the reflectance component of the input image. A method for extending the reflectance component of this embodiment shall be illustrated below.

For example, the extending unit 103 may extend a contrast of the reflectance component in a logarithm domain. For example, the contrast of the reflectance component may be extended by using Formula (5) and (6) below:

$$S = \log(R(x)) = \log(Y(x) + \varepsilon) - \log(L(x) + \varepsilon), \quad (5)$$

and $$S_{out}(x) = S(x) + \left(\frac{S(x) - \min(S)}{\max(S) - \min(S)} - \frac{1}{2}\right) * d; \quad (6)$$

where, R(x) denotes a reflectance component, S denotes a reflectance component in a logarithm domain, $S_{out}(x)$ denotes a reflectance component extended in a logarithm domain, L(x) denotes an illumination component, Y(x) denotes luminance of an input image, ε denotes an arithmetical adjustment coefficient, and d denotes a contrast enhancement coefficient.

Figure 8:
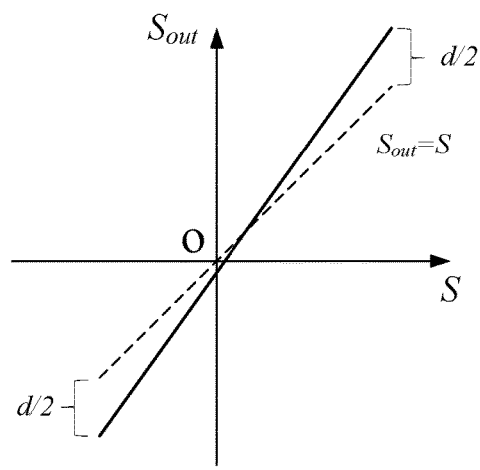
FIG. 8 is a schematic diagram of a curve of an extending function expressed by Formula (6) of Embodiment 1 of the present disclosure.

FIG. 8 is a schematic diagram of a curve of an extending function expressed by Formula (6) of this embodiment. As shown in FIG. 8, the maximum value max(S) and minimum value min(S) of S are respectively extended into max(S)+d/2 and min(S)−d/2.

In this embodiment, a value of the contrast enhancement coefficient d may be set according to an actual application demand. For example, the greater the value of d, the higher of the contrast of the image.

In this embodiment, after compressing the illumination component and extending the reflectance component, the combining unit 101 combines the compressed illumination component and the extended reflectance component, so as to obtain the combined luminance. In this embodiment, any existing method may be used to combine the compressed illumination component and the extended reflectance component. For example, Formula (7) below may be used for combining:

$$Y_{out}(x) = \exp(S_{out}(x) + \log(L_{out}(x) + \varepsilon)) \qquad (7);$$

where, $Y_{out}(x)$ denotes the combined luminance, $S_{out}(x)$ denotes the reflectance component after being extended in the logarithm domain, $L_{out}(x)$ denotes the illumination component after the gain and suppression, and ε denotes an arithmetical adjusting coefficient for avoiding that a logarithm is 0.

In this embodiment, there may exists a deviation in a distribution range of the combined luminance. Hence, the adjusting unit 105 is used to adjust the combined luminance. In this embodiment, any existing method may be used to adjust the combined luminance. For example, Formula (8) below may be used to adjust the combined luminance:

$$Y'_{out}(x) = \frac{y_m}{\mathrm{mean}(Y_{out})} * Y_{out}(x); \qquad (8)$$

where, $Y_{out}(x)$ denotes the combined luminance, $Y'_{out}(x)$ denotes an adjusted luminance, $\mathrm{mean}(Y_{out})$ denotes an average value of the combined luminance, and $y_m$ denotes a predefined target luminance.

In this embodiment, the predefined target luminance $y_m$ may be set according to an actual application demand. For example, $y_m$ may be set to be 0.5. However, this embodiment of the present disclosure is not limited to the above value.

In this embodiment, when the input image is a gray scale image, the adjusted luminance may be cut off, and any existing method may be used for the cut-off. For example, the adjusted luminancer $Y'_{out}(x)$ is cut off into a range of [0,1], and then the image is outputted.

When the input image is a color image, the apparatus 100 may further include a reconstructing unit 107 configured to perform color reconstruction according to the adjusted luminancer $Y'_{out}(x)$. In this embodiment, the reconstructing unit 107 is optional, which is shown in a dotted box in FIG. 1.

In this embodiment, any existing method may be used by the reconstructing unit 107 for performing the color reconstruction. For example, Formula (9) below may be used to perform the color reconstruction:

$$I^c_{out}(x) = \beta \cdot \left(\frac{Y'_{out}(x)}{Y(x)} I^c(x)\right) + (1-\beta) \cdot (Y'_{out}(x) - Y(x) + I^c(x)); \qquad (9)$$

where, $I_{out}^c(x)$ denotes RGB components after the reconstruction, $I^c(x)$ denotes RGB components of the input image, $Y(x)$ denotes the luminance of the input image, $Y'_{out}(x)$ denotes the adjusted luminance, and β denotes a saturation adjustment parameter, 0≤β≤1.

In this embodiment, the saturation adjustment parameter β may be set according to an actual application demand. For example, β may be set to be 0.6. However, this embodiment of the present disclosure is not limited to the above value.

In this embodiment, the image after the color reconstruction may further be cut off, and any existing method may be used for the cut-off. For example, all pixel values may be cut off into a range of [0,1], and then the image is outputted.

It can be seen from the above embodiment that by compressing the illumination component of an input image and extending the reflectance component, a contrast of the image may be efficiently enhanced and an image of a high dynamic range may be obtained, whereby a display effect of the image may be improved.

Furthermore, by obtaining the illumination component of the input image by the edge-preserving filtering, a display effect of the edge parts of the image may be improved, and generation of a halo phenomenon may be avoided.

By performing the edge-preserving filtering by using the weighted least squares (WLS), the obtained illumination component may be made more reliable.

By performing gain on the luminance of the under-exposed pixels and performing suppression on the luminance of the over-exposed pixels, exposure of the image may be made uniform, whereby the display effect of the image may be improved further.

Embodiment 2

An embodiment of the present disclosure provides electronic equipment, including the image processing apparatus as described in Embodiment 1.

Figure 9:
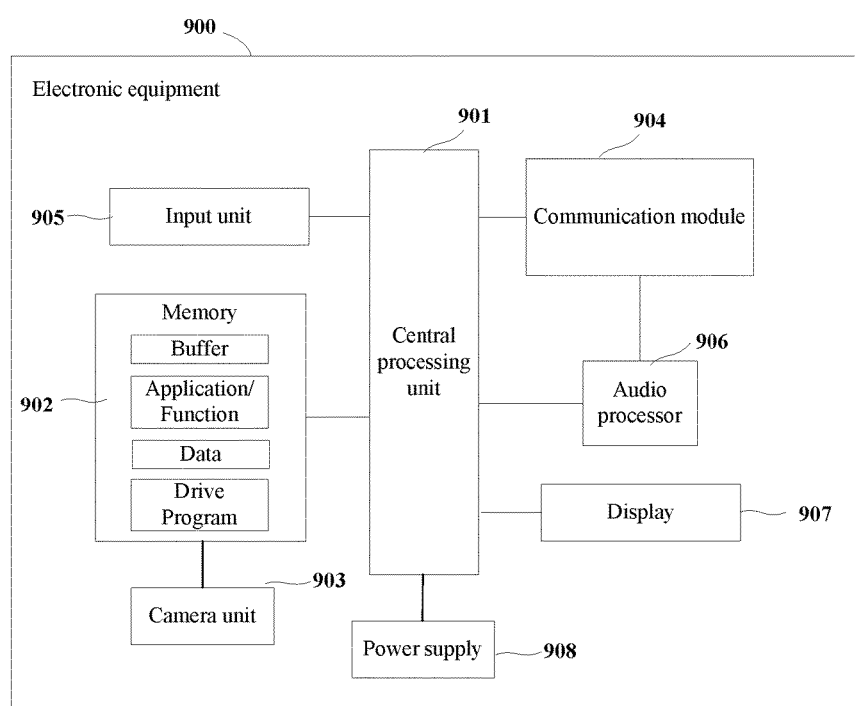
FIG. 9 is a block diagram of a systematic structure of the electronic equipment of Embodiment 2 of the present disclosure.

FIG. 9 is a block diagram of a systematic structure of the electronic equipment of Embodiment 2 of the present disclosure. As shown in FIG. 9, the electronic equipment 900 may include a central processing unit 901 and a memory 902, the memory 902 being coupled to the central processing unit 901. This figure is illustrative only, and other types of structures may also be used, so as to supplement or replace this structure and achieve telecommunications function or other functions.

As shown in FIG. 9, the electronic equipment 900 may further include a camera unit 903, a communication module 904, an input unit 905, an audio processor 906, a display 907, and a power supply 908. For example, the camera unit 903 may input shot images into the memory 902 for storage.

In an implementation, the function of the image processing apparatus may be integrated into the central processing unit 901. In this embodiment, the central processing unit 901 may be configured to: decompose luminance of an input image into an illumination component and a reflectance component; compress the illumination component; extend the reflectance component; combine the compressed illumination component and the extended reflectance component, to obtain combined luminance; and adjust the combined luminance.

In this embodiment, the decomposing luminance of an input image into an illumination component and a reflectance component includes: performing edge-preserving filtering on the luminance of the input image, so as to obtain the illumination component; and determining the reflectance component according to the luminance of the input image and the illumination component.

In this embodiment, the performing edge-preserving filtering on the luminance of the input image includes: using weighted least squares (WLS) to perform the edge-preserving filtering.

In this embodiment, the compressing the illumination component includes compressing each pixel of the illumination component; and the compressing each pixel includes: judging whether luminance of the pixel is greater than an average value of luminance of the illumination component; and performing gain on the luminance of the pixel when the luminance of the pixel is less than or equal to the average value of luminance of the illumination component, and performing suppression on the luminance of the pixel when the luminance of the pixel is greater than the average value of luminance of the illumination component.

In this embodiment, the extending the reflectance component includes: extending a contrast of the reflectance component in a logarithm domain.

In another implementation, the image processing apparatus and the central processing unit 901 may be configured separately. For example, the image processing apparatus may be configured as a chip connected to the central processing unit 901, with its functions being realized under control of the central processing unit 901.

In this embodiment, the electronic equipment 900 does not necessarily include all the parts shown in FIG. 9.

As shown in FIG. 9, the central processing unit 901 is sometimes referred to as a controller or control, and may include a microprocessor or other processor devices and/or logic devices. The central processing unit 901 receives input and controls operations of every components of the electronic equipment 900.

The memory 902 may be, for example, one or more of a buffer memory, a flash memory, a hard drive, a mobile medium, a volatile memory, a nonvolatile memory, or other suitable devices. And the central processing unit 901 may execute the programs stored in the memory 902, so as to realize information storage or processing, etc. Functions of other parts are similar to those of the relevant art, which shall not be described herein any further. The parts of the electronic equipment 900 may be realized by specific hardware, firmware, software, or any combination thereof, without departing from the scope of the present disclosure.

In this embodiment, the electronic equipment is, for example, a portable radio communication apparatus, which includes such apparatuses as a mobile telephone, a smart mobile phone, a pager, a communicator, an electronic blotter, a personal digital assistant (PDA), a smartphone, a portable communication device or the like. Furthermore, the electronic equipment may be equipment with a function of a camera shooting, and such equipment may have no function of communication, such as a camera, and a video camera, etc. And a type of the electronic equipment is not limited in embodiments of the present disclosure.

It can be seen from the above embodiment that by compressing the illumination component of an input image and extending the reflectance component, a contrast of the image may be efficiently enhanced and a image of a high dynamic range may be obtained, whereby a display effect of the image may be improved.

Embodiment 3

Figure 10:
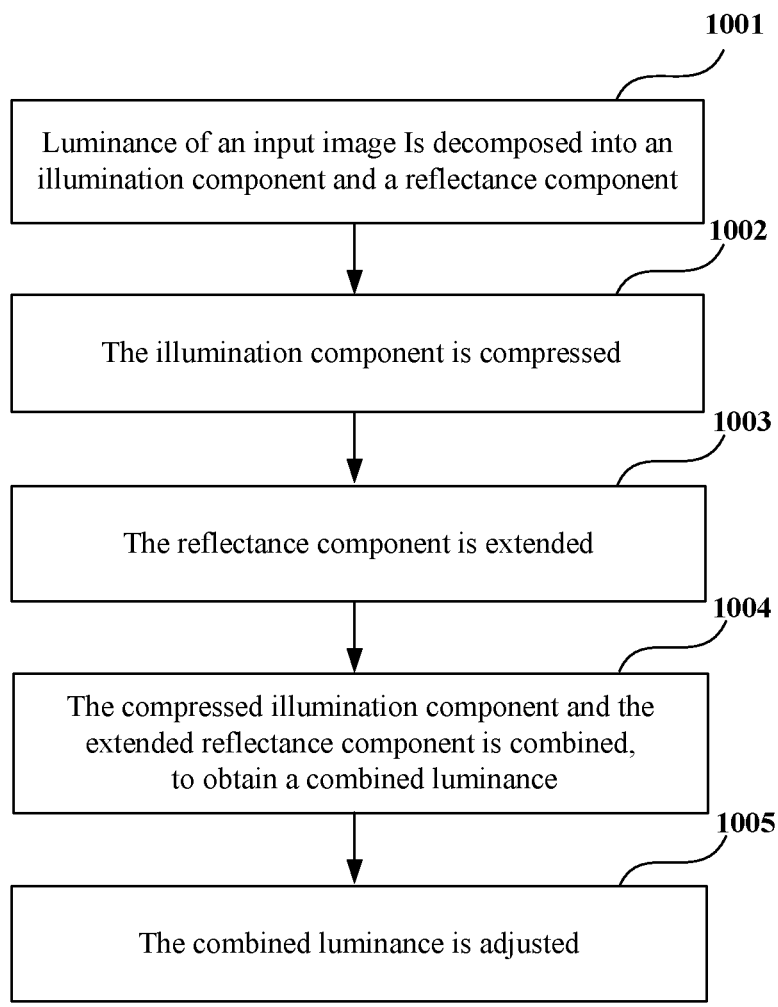
FIG. 10 is a flowchart of the image processing method of Embodiment 3 of the present disclosure.

FIG. 10 is a flowchart of the image processing method of Embodiment 3 of the present disclosure, corresponding to the image processing apparatus of Embodiment 1. As shown in FIG. 10, the method includes:

Step 1001: luminance of an input image is decomposed into an illumination component and a reflectance component;

Step 1002: the illumination component is compressed;

Step 1003: the reflectance component is extended;

Step 1004: the compressed illumination component and the extended reflectance component is combined, to obtain combined luminance; and Step 1005: the combined luminance is adjusted.

In this embodiment, an order of executing steps 1002 and 1003 is not limited. For example, step 1002 may be executed first, and then step 1003 is executed; or step 1003 may be executed first, and then step 1002 is executed; or steps 1002 and 1003 are executed at the same time.

In this embodiment, the method for obtaining the input image and the method for obtaining the luminance of the input image, the method for decomposing the luminance of the input image into the illumination component and the reflectance component, the method for compressing the illumination component and the method for extending the reflectance component, the method for combining the compressed illumination component and the extended reflectance component and the method for adjusting the combined luminance are identical to those described in Embodiment 1, and shall not be described herein any further.

It can be seen from the above embodiment that by compressing the illumination component of an input image and extending the reflectance component, a contrast of the image may be efficiently enhanced and an image of a high dynamic range may be obtained, whereby a display effect of the image may be improved.

Embodiment 4

Figure 11:
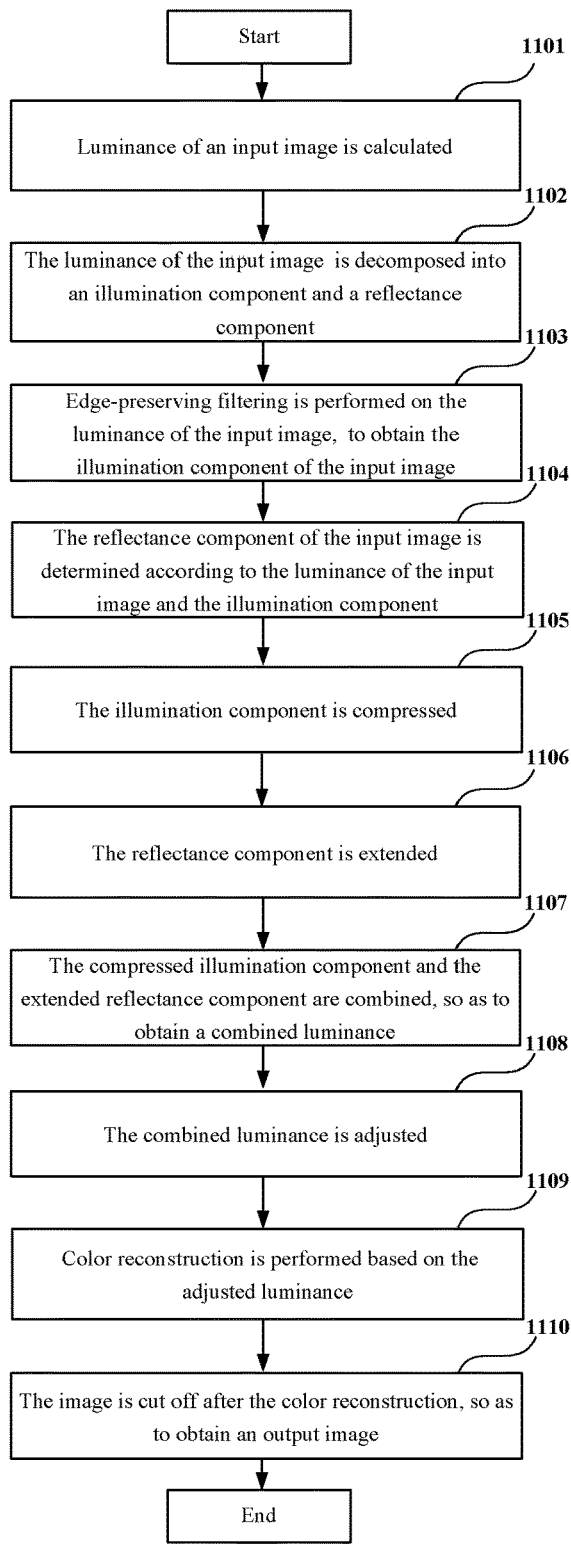
FIG. 11 is a flowchart of the image processing method of Embodiment 4 of the present disclosure.

FIG. 11 is a flowchart of the image processing method of Embodiment 4 of the present disclosure, which is used to describe an application example of processing a color image by the image processing apparatus of Embodiment 1. As shown in FIG. 11, the method includes:

Step 1101: luminance of an input image is calculated;

Step 1102: the luminance of the input image is decomposed into an illumination component and a reflectance component;

Step 1103: edge-preserving filtering is performed on the luminance of the input image, so as to obtain the illumination component of the input image;

Step 1104: the reflectance component of the input image is determined according to the luminance of the input image and the illumination component;

Step 1105: the illumination component is compressed;

Step 1106: the reflectance component extended;

Step 1107: the compressed illumination component and the extended reflectance component are combined, to obtain combined luminance;

Step 1108: the combined luminance is adjusted;

Step 1109: color reconstruction is performed based on the adjusted luminance; and Step 1110: the image is cut off after the color reconstruction, so as to obtain an output image.

In this embodiment, an order of executing steps 1105 and 1106 is not limited. For example, Step 1105 may be executed first, and then step 1106 is executed; or step 1106 may be executed first, and then Step 1105 is executed; or steps 1105 and 1106 are executed at the same time.

In this embodiment, the method for calculating luminance of an input image, the method for decomposing the luminance of the input image into an illumination component and a reflectance component, the method for performing edge-preserving filtering, the method for determining the reflectance component of the input image according to the luminance of the input image and the illumination component, the method for compressing the illumination component and the method for extending the reflectance component, the method for combining the compressed illumination component and the extended reflectance component, the method for adjusting the combined luminance, the method for performing color reconstruction based on the adjusted luminance and the method for cutting off the image after the color reconstruction are identical to those described in Embodiment 1, and shall not be described herein any further.

It can be seen from the above embodiment that by compressing the illumination component of an input image and extending the reflectance component, a contrast of the image may be efficiently enhanced and an image of a high dynamic range may be obtained, whereby a display effect of the image may be improved.

An embodiment of the present disclosure further provides a computer-readable program, and when the program is executed in an image processing apparatus or electronic equipment, the program enables the computer to carry out the image processing method as described in Embodiment 3 or 4 in the image processing apparatus or the electronic equipment.

An embodiment of the present disclosure further provides a storage medium in which a computer-readable program is stored, and the computer-readable program enables the computer to carry out the image processing method as described in Embodiment 3 or 4 in an image processing apparatus or electronic equipment.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. An image processing apparatus, comprising:
   a memory that stores a plurality of instructions;
   a processor that couples to the memory and causes the image processing apparatus to:
   decompose luminance of an input image into an illumination component and a reflectance component;
   compress the illumination component;
   extend the reflectance component;
   combine a compressed illumination component and an extended reflectance component, to obtain a combined luminance; and
   adjust the combined luminance to obtain a processed image with an adjusted luminance, whose contrast is enhanced;
   wherein when decomposing luminance of an input image into an illumination component and a reflectance component, the processor further causes the image processing apparatus to:
   perform edge-preserving filtering on the luminance of the input image, to obtain the illumination component; and
   determine the reflectance component according to the luminance of the input image and the illumination component;
   wherein when performing edge-preserving filtering on the luminance of the input image, the processor further causes the image processing apparatus to perform the edge-preserving filtering by using weighted least squares (WLS);
   wherein formula (4) is used for adjusting the combined luminance:

$$Y'_{out}(x) = \frac{y_m}{\text{mean}(Y_{out})} * Y_{out}(x); \quad (4)$$

where, $Y_{out}(x)$ denotes combined luminance, $Y'_{out}(x)$ denotes an adjusted luminance, mean($Y_{out}$) denotes an average value of the combined luminance, and $y_m$ denotes a predefined target luminance.

2. The apparatus according to claim 1, wherein when compressing the illumination component, the processor further causes the image processing apparatus to compress each pixel of the illumination component; and in compressing each pixel, the processor further causes the image processing apparatus to:
   judge whether luminance of the pixel is greater than an average value of luminance of the illumination component; and
   perform gain on the luminance of the pixel when the luminance of the pixel is less than or equal to the average value of luminance of the illumination component, and perform suppression on the luminance of the pixel when the luminance of the pixel is greater than the average value of luminance of the illumination component.

3. The apparatus according to claim 2, wherein formula (1) is used for performing one of the gain or suppression:

$$L_{out}(x) = (1 - a(L(x))) * L(x) + a(L(x)) * \text{mean}(L(x)) \quad (1);$$

where, $a(L(x))$ denotes one of a gain and suppression coefficient, respectively, values of which being different when $L(x) \leq \text{mean}(L(x))$ or $L(x) > \text{mean}(L(x))$, where values of $a(L(x))$ are different in performing the gain or suppression, $0 \leq a(L(x)) \leq 1$; $L_{out}(x)$ denotes an illumination component after the one of the gain and suppression, $L(x)$ denotes an illumination component before the one of the gain and suppression, and mean($L(x)$) denotes the average value of luminance of the illumination component.

4. The apparatus according to claim 1, wherein when extending the reflectance component, the processor further causes the image processing apparatus to extend a contrast of the reflectance component in a logarithm domain.

5. The apparatus according to claim 4, wherein formula (2) and (3) are used for extending a contrast of the reflectance component:

$$S = \log(R(x)) = \log(Y(x) + \varepsilon) - \log(L(x) + \varepsilon), \quad (2)$$

and $$S_{out}(x) = S(x) + \left(\frac{S(x) - \min(S)}{\max(S) - \min(S)} - \frac{1}{2}\right) * d; \quad (3)$$

where, $R(x)$ denotes a reflectance component, S denotes a reflectance component in a logarithm domain, $S_{out}(x)$ denotes a reflectance component extended in a logarithm domain, $L(x)$ denotes an illumination component, $Y(x)$ denotes luminance of an input image, $\varepsilon$ denotes an arithmetical adjustment coefficient, and d denotes a contrast enhancement coefficient.

6. The apparatus according to claim 1, wherein the processor further causes the image processing apparatus to:
calculate luminance of the input image; and
perform color reconstruction according to an adjusted luminance.

7. Electronic equipment, comprising the image processing apparatus as claimed in claim 1.

8. An image processing method, comprising the following steps performed by an image processing apparatus:
decomposing luminance of an input image into an illumination component and a reflectance component;
compressing the illumination component;
extending the reflectance component;
combining a compressed illumination component and an extended reflectance component, to obtain a combined luminance; and
adjusting the combined luminance to obtain a processed image with an adjusted luminance, whose contrast is enhanced;
wherein the decomposing luminance of an input image into an illumination component and a reflectance component comprises:
performing edge-preserving filtering on the luminance of the input image, to obtain the illumination component; and
determining the reflectance component according to the luminance of the input image and the illumination component
wherein the performing edge-preserving filtering on the luminance of the input image comprises: performing the edge-preserving filtering by using weighted least squares (WLS);
wherein formula (4) is used for adjusting the combined luminance:

$$Y'_{out}(x) = \frac{y_m}{\text{mean}(Y_{out})} * Y_{out}(x); \quad (4)$$

where, $Y_{out}(x)$ denotes combined luminance, $Y'_{out}(x)$ denotes an adjusted luminance, $\text{mean}(Y_{out})$ denotes an average value of the combined luminance, and $y_m$ denotes a predefined target luminance.

9. The method according to claim 8, wherein the compressing the illumination component comprises compressing each pixel of the illumination component,
wherein the compressing each pixel comprising:
judging whether luminance of the pixel is greater than an average value of luminance of the illumination component; and
performing gain on the luminance of the pixel when the luminance of the pixel is less than or equal to the average value of luminance of the illumination component, and performing suppression on the luminance of the pixel when the luminance of the pixel is greater than the average value of luminance of the illumination component.

10. The method according to claim 9, wherein formula (1) is used for performing one of the gain or suppression:

$$Y(x) = R(x) \cdot L(x) \quad (2);$$

where, $a(L(x))$ denotes a gain or suppression coefficient, values of which being different when $L(x) \leq \text{mean}(L(x))$ or $L(x) > \text{mean}(L(x))$, where values of $a(L(x))$ are different in performing the one of the gain and suppression, $0 \leq a(L(x)) \leq 1$; $L_{out}(x)$ denotes an illumination component after the one of the gain and suppression, $L(x)$ denotes an illumination component before the one of the gain and suppression, and $\text{mean}(L(x))$ denotes an average value of luminance of the illumination component.

11. The method according to claim 8, wherein the extending the reflectance component comprises: extending a contrast of the reflectance component in a logarithm domain.

12. The method according to claim 11, wherein formula (2) and (3) are used for extending a contrast of the reflectance component:

$$S = \log(R(x)) = \log(Y(x) + \varepsilon) - \log(L(x) + \varepsilon), \quad (2)$$

and $$S_{out}(x) = S(x) + \left(\frac{S(x) - \min(S)}{\max(S) - \min(S)} - \frac{1}{2}\right) * d; \quad (3)$$

where, $R(x)$ denotes a reflectance component, S denotes a reflectance component in a logarithm domain, $S_{out}(x)$ denotes a reflectance component extended in a logarithm domain, $L(x)$ denotes an illumination component, $Y(x)$ denotes luminance of an input image, $\varepsilon$ denotes an arithmetical adjustment coefficient, and d denotes a contrast enhancement coefficient.

13. The method according to claim 8, wherein the method further comprises:
calculating luminance of the input image; and
performing color reconstruction according to an adjusted luminance.

14. A non-transitory computer readable medium comprising an image processing method, the image processing method, comprising:
decomposing luminance of an input image into an illumination component and a reflectance component;
compressing the illumination component;
extending the reflectance component;
combining a compressed illumination component and an extended reflectance component, to obtain a combined luminance; and
adjusting the combined luminance to obtain a processed image with an adjusted luminance, whose contrast is enhanced;

wherein the decomposing luminance of an input image into an illumination component and a reflectance component comprises:

performing edge-preserving filtering on the luminance of the input image, to obtain the illumination component; and determining the reflectance component according to the luminance of the input image and the illumination component wherein the performing edge-preserving filtering on the luminance of the input image comprises: performing the edge-preserving filtering by using weighted least squares (WLS);

wherein formula (4) is used for adjusting the combined luminance:

$$S = \log(R(x)) = \log(Y(x) + \varepsilon) - \log(L(x) + \varepsilon), \quad (2)$$
and $$S_{out}(x) = S(x) + \left(\frac{S(x) - \min(S)}{\max(S) - \min(S)} - \frac{1}{2}\right) * d; \quad (3)$$

where, $Y_{out}(x)$ denotes combined luminance, $Y'_{out}(x)$ denotes an adjusted luminance, $\text{mean}(Y_{out})$ denotes an average value of the combined luminance, and $y_m$ denotes a predefined target luminance.

* * * * *